E. M. LOW.
TYPOGRAPHIC COMPOSING MACHINE.
APPLICATION FILED DEC. 14, 1916.

1,378,045.

Patented May 17, 1921.
12 SHEETS—SHEET 4.

Inventor
Everett M. Low

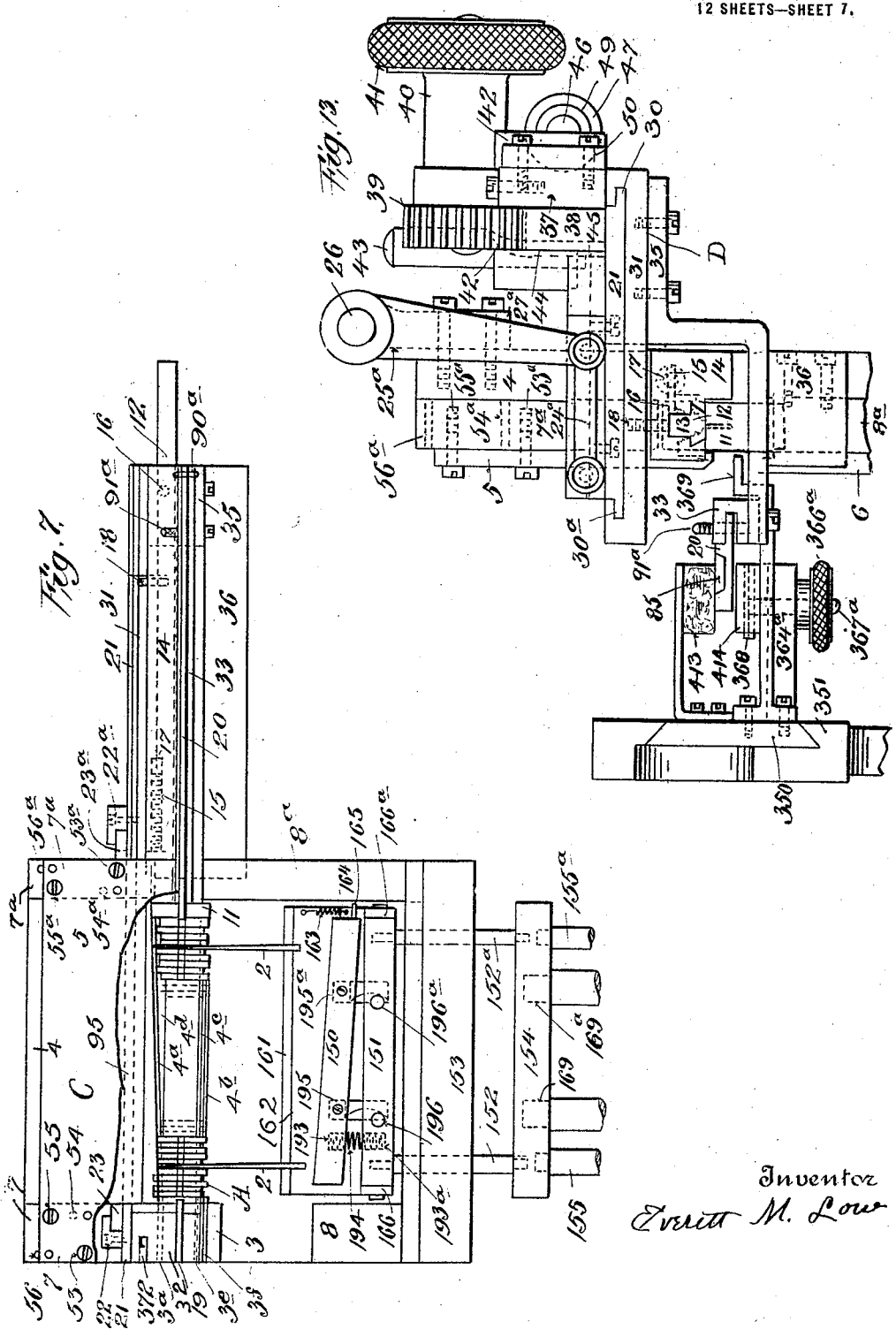

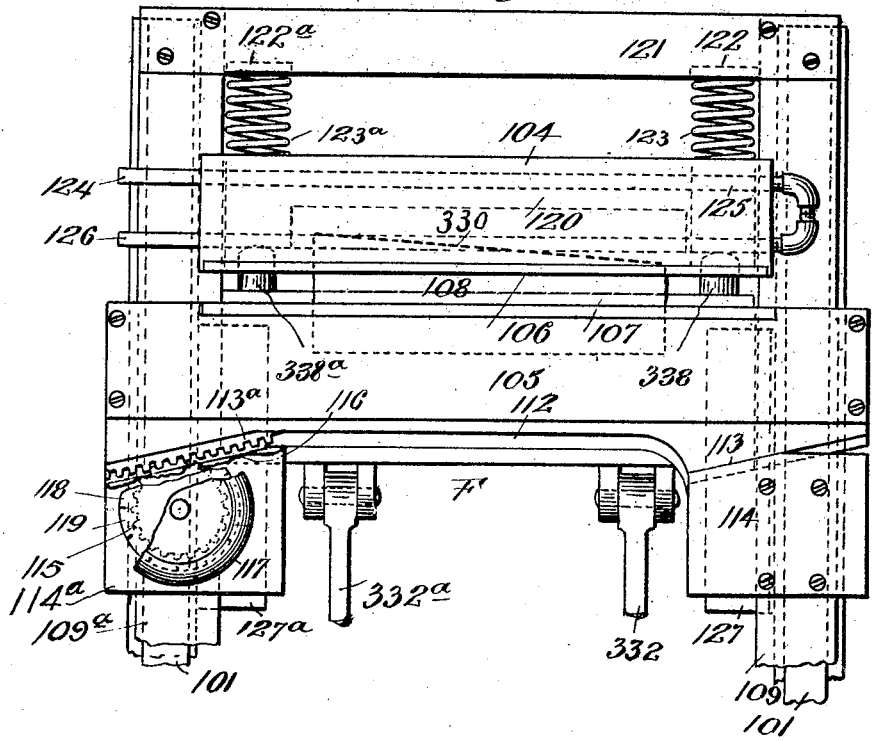

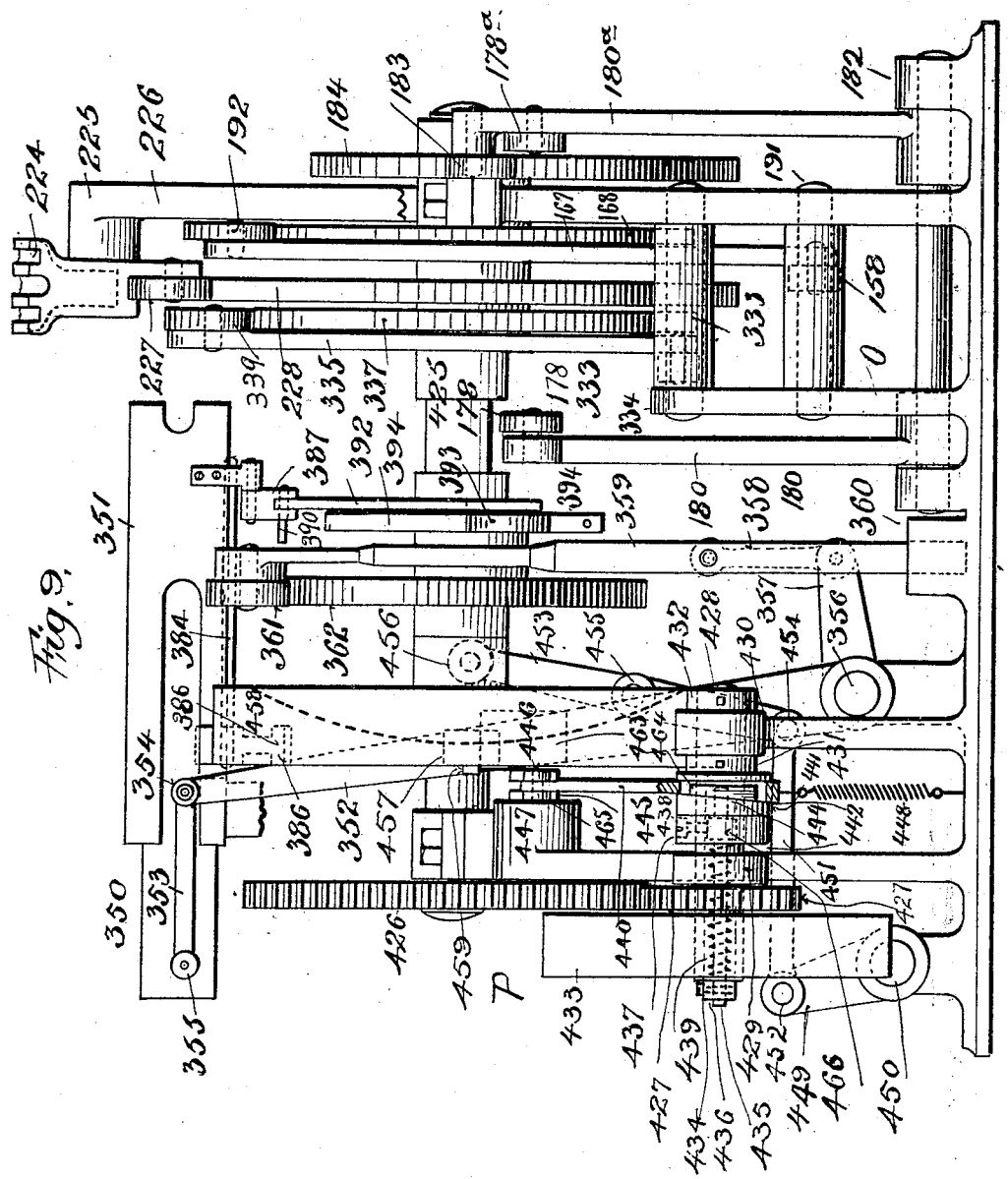

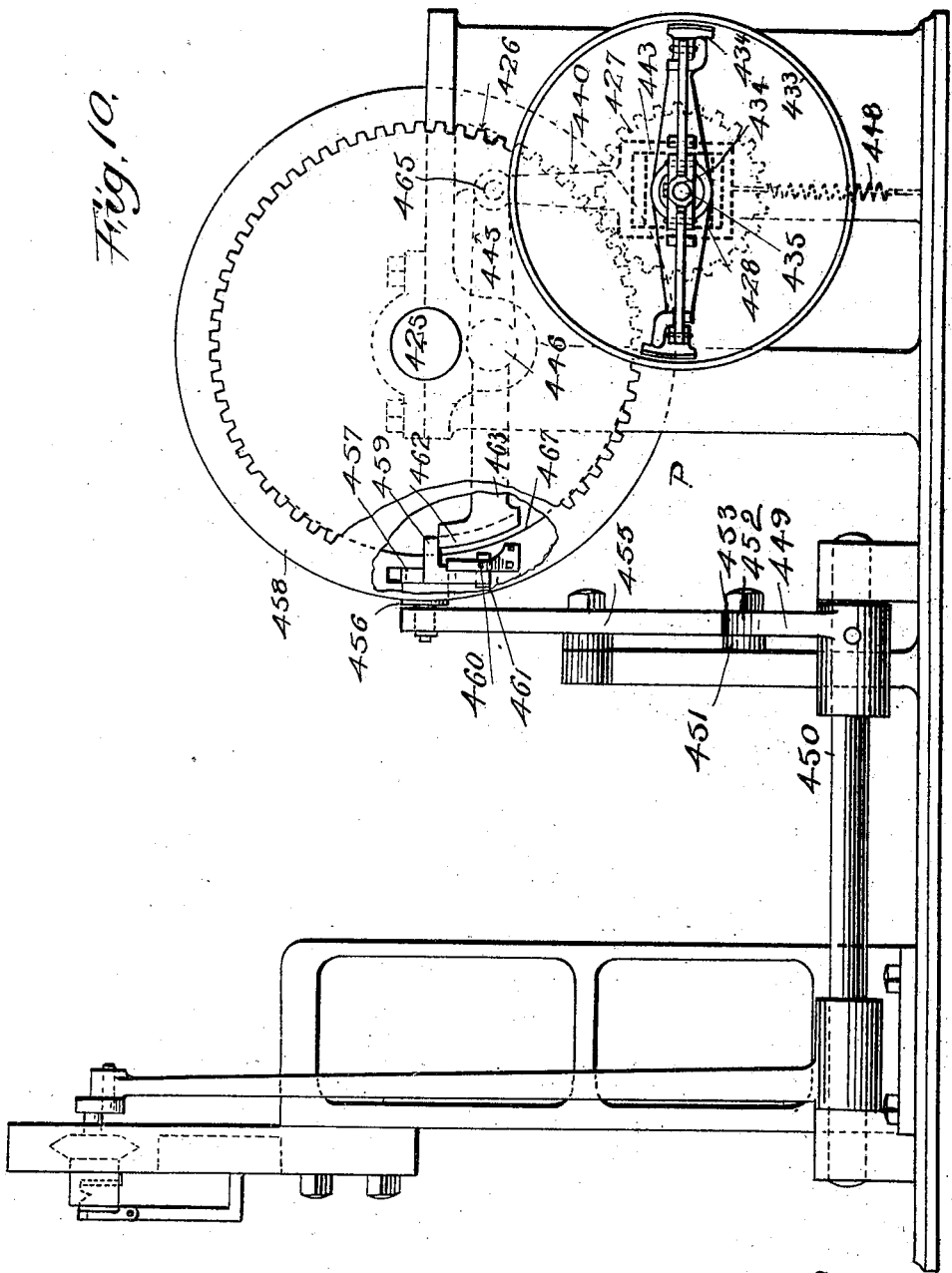

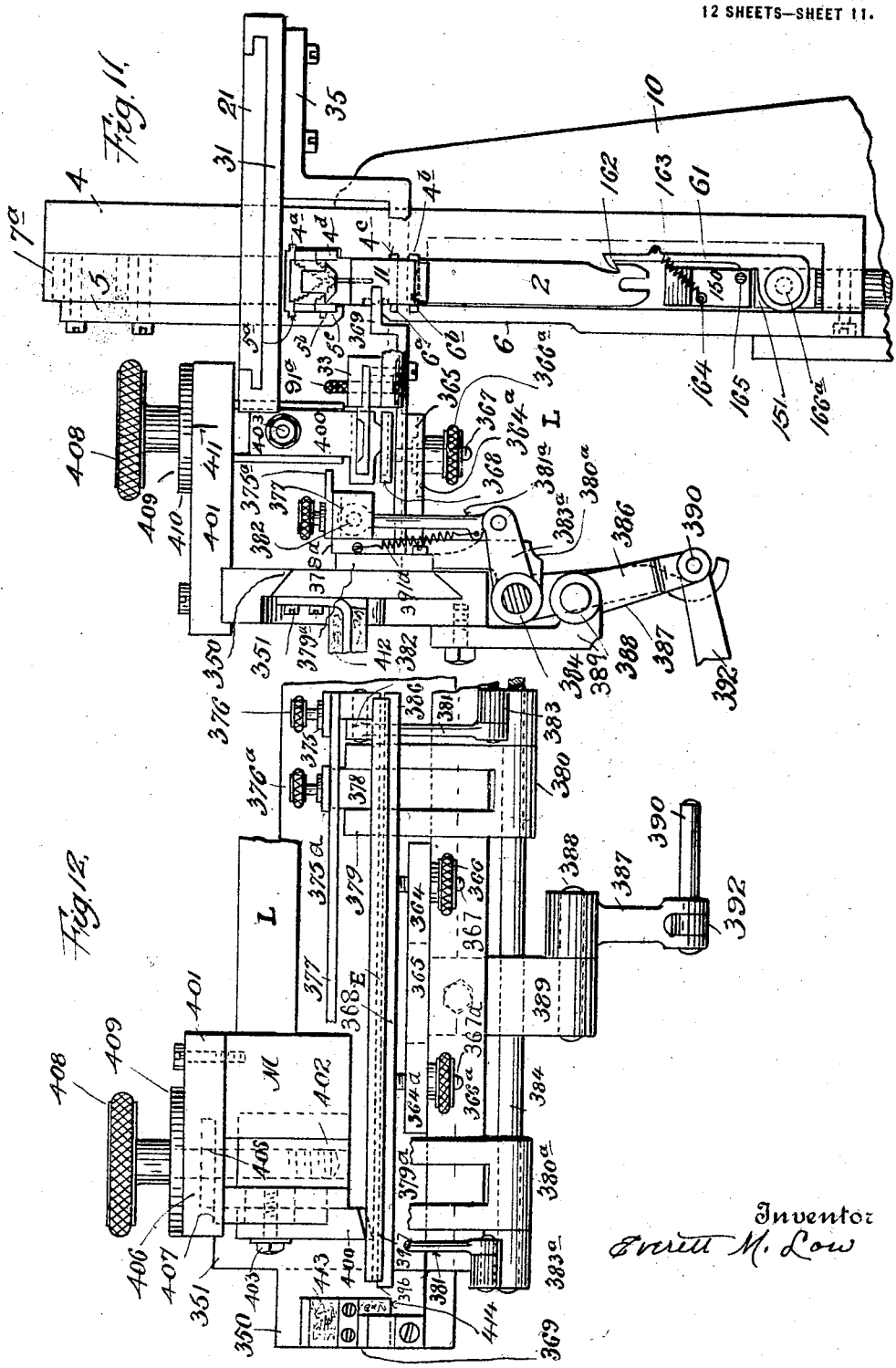

E. M. LOW.
TYPOGRAPHIC COMPOSING MACHINE.
APPLICATION FILED DEC. 14, 1916.
1,378,045.
Patented May 17, 1921.
12 SHEETS—SHEET 12.
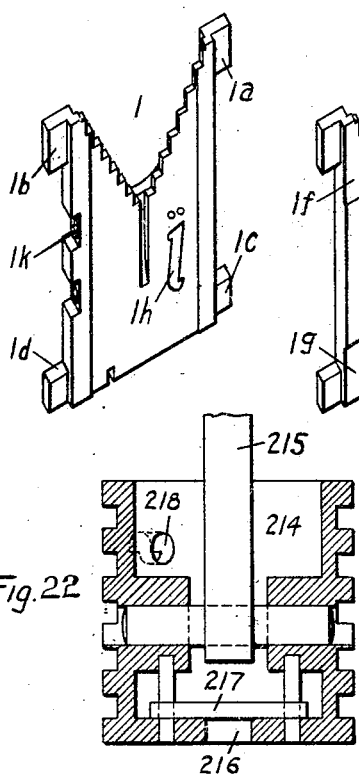
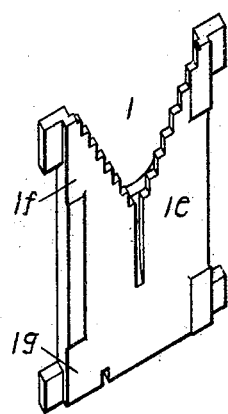
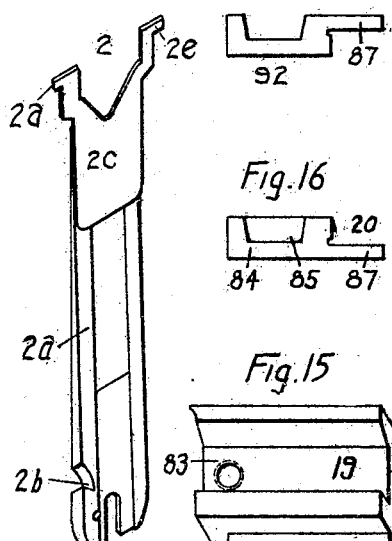
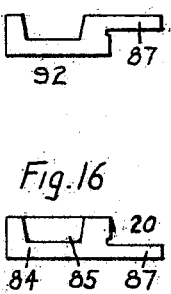
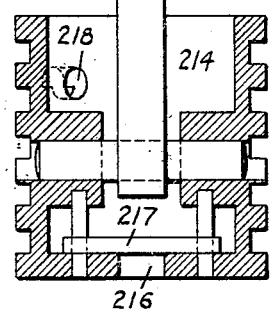
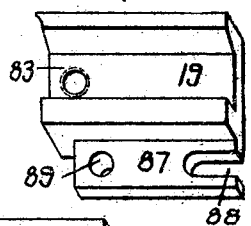
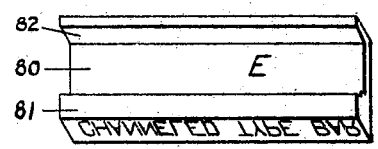
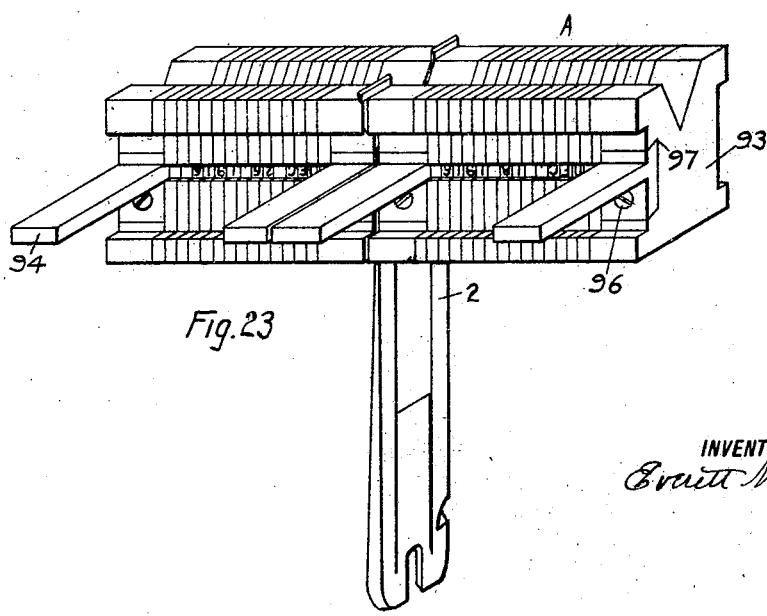
INVENTOR
Everett M. Low

UNITED STATES PATENT OFFICE.

EVERETT M. LOW, OF BROOKLYN, NEW YORK.

TYPOGRAPHIC COMPOSING-MACHINE.

1,378,045.  Specification of Letters Patent.  Patented May 17, 1921.

Application filed December 14, 1916. Serial No. 137,064.

*To all whom it may concern:*

Be it known that I, EVERETT M. Low, a citizen of the United States, residing at Brooklyn, in the county of Kings and State of New York, have invented certain new and useful Improvements in Typographic Composing-Machines, of which the following is a specification.

My invention relates to typographic composing machines, in which a matrix or a series of matrices and spacers are disposed in contiguous alinement with a mold, arranged to receive molten metal; producing a slug bearing a character or a series of characters, adapted to be reproduced by the process of printing.

The object of my improvements is to provide a machine whereby to increase the quantity and quality of production and to execute a wider range of work than is possible with the machines of this class now in use.

I attain this object by the mechanism illustrated in the accompanying drawings in which:—

Fig. 7 is a rear elevation of the vise in the initial position.

Fig. 8 is a front elevation of the mold, in the initial position.

Fig. 9 is a rear elevation of the cams and actuating mechanism.

Fig. 10 is an elevation of the actuating mechanism.

Fig. 11 is an elevation of the slug removing and trimming mechanism.

Fig. 12 is a front view of the slug trimmer.

Fig. 13 is an end elevation of the liner carrier and liner setting mechanism.

Fig. 14 is an elevation of the right hand vise jaw and liner socket.

Fig. 15 is a perspective view of the right hand liner.

Fig. 16 is an end view of the left hand liner and channel bar.

Fig. 17 is an end view of the left hand liner of modified form.

Fig. 18 is a perspective view of one of the spacers.

Fig. 19 is a perspective view of one of the matrices, showing reduced bearing surfaces.

Fig. 20 is a perspective view of one of the matrices, showing identification stamp.

Fig. 21 is a perspective view of a slug.

Fig. 22 is a central vertical cross section of the filling well bucket.

Fig. 23 is a perspective view of an assembled line having the separating blocks and blades.

Referring to the drawings in which similar letters or figures refer to similar parts throughout the several views:

Figure 1:
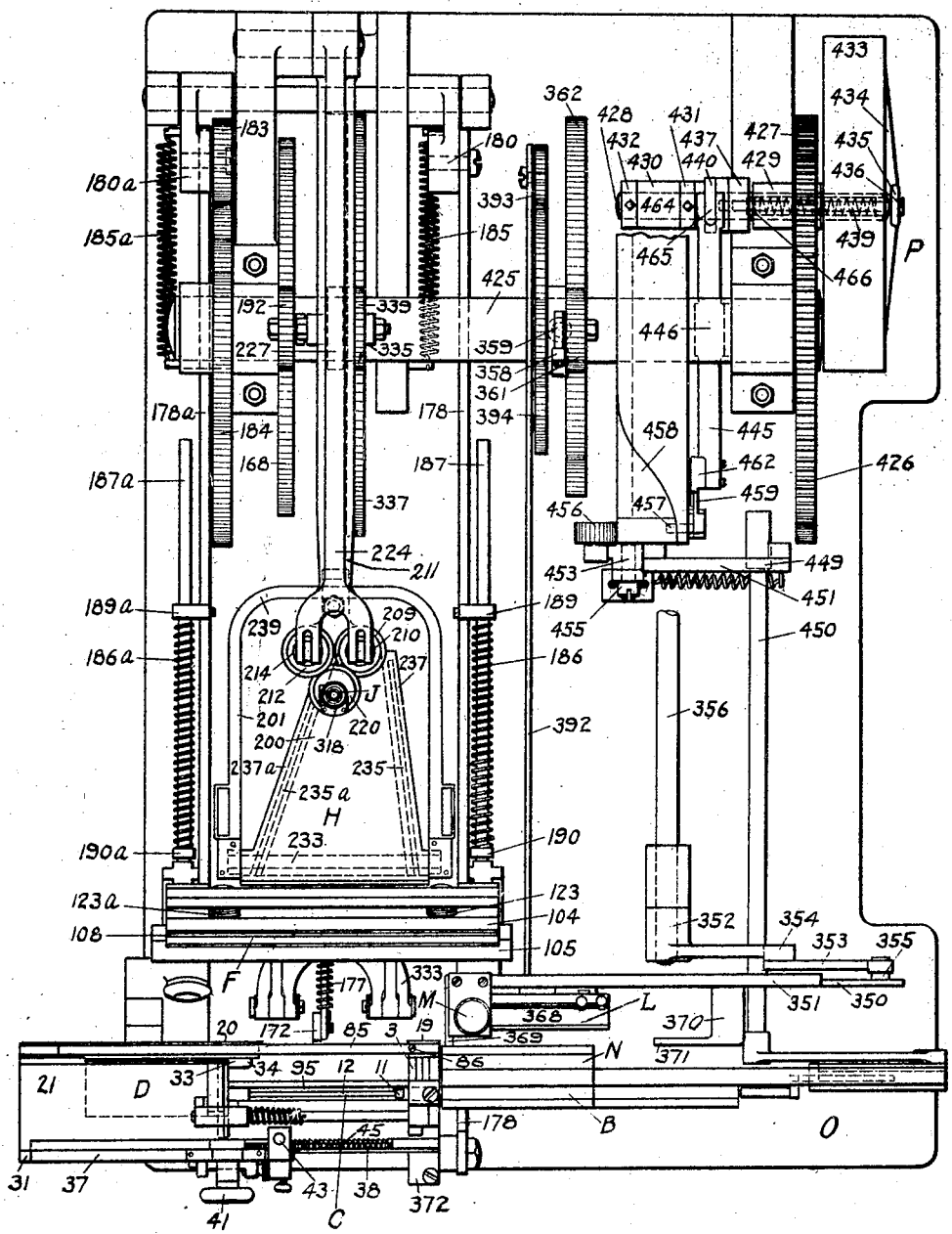
Figure 1 is a plan of the machine in its initial position.
Figure 2:
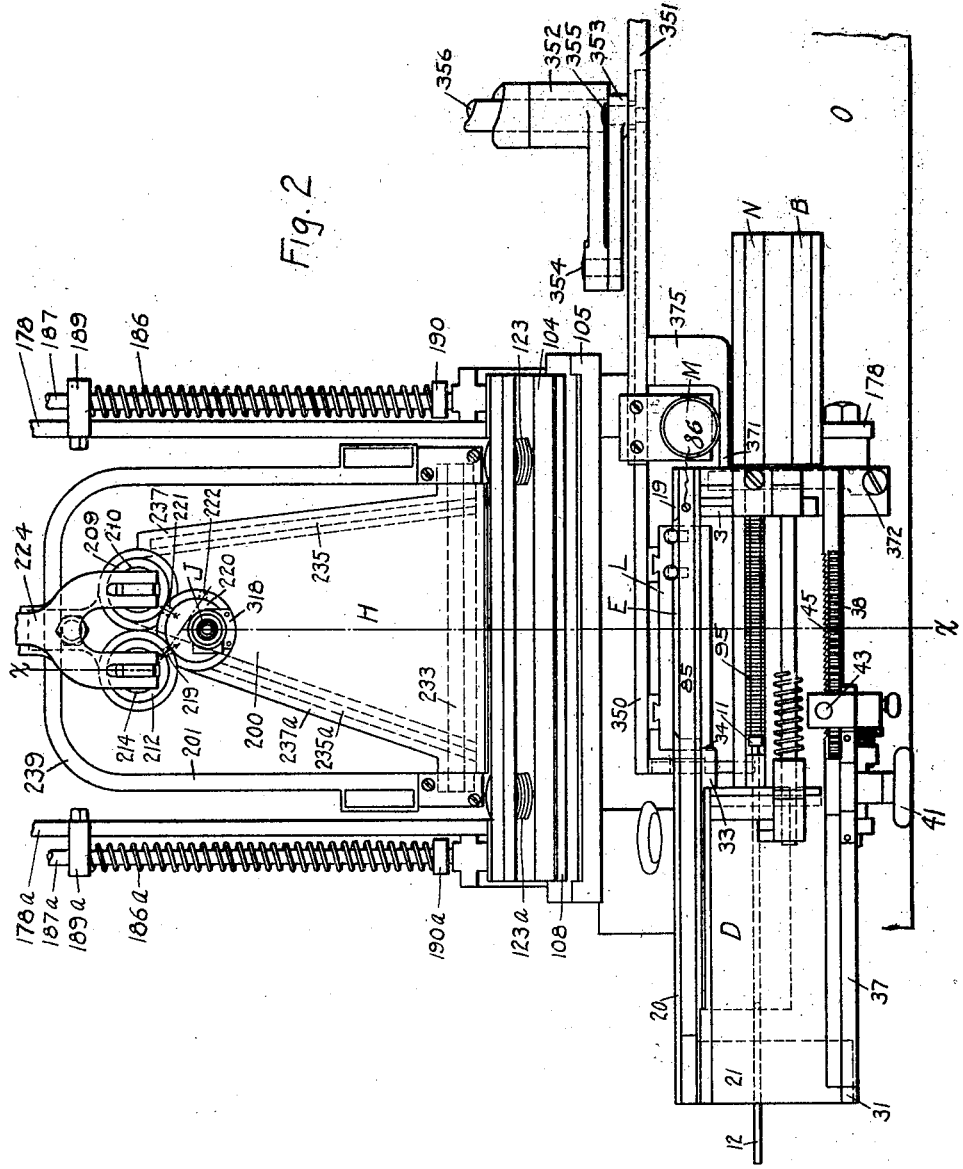
Fig. 2 is a plan, in position to discharge the matrix and the slug.
Figure 3:
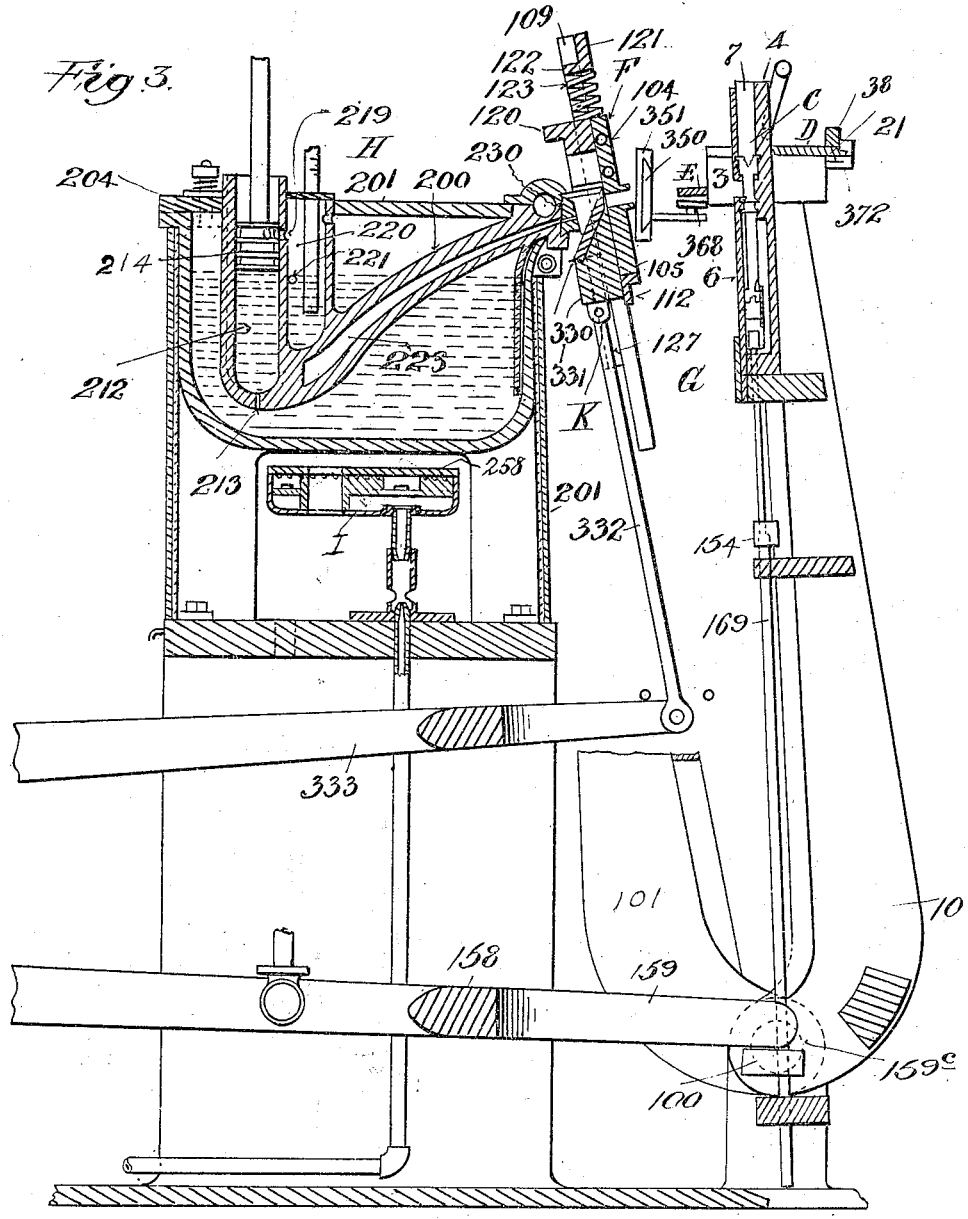
Fig. 3 is an elevation in section on line $x$—$x$, Fig. 2.
Figure 4:
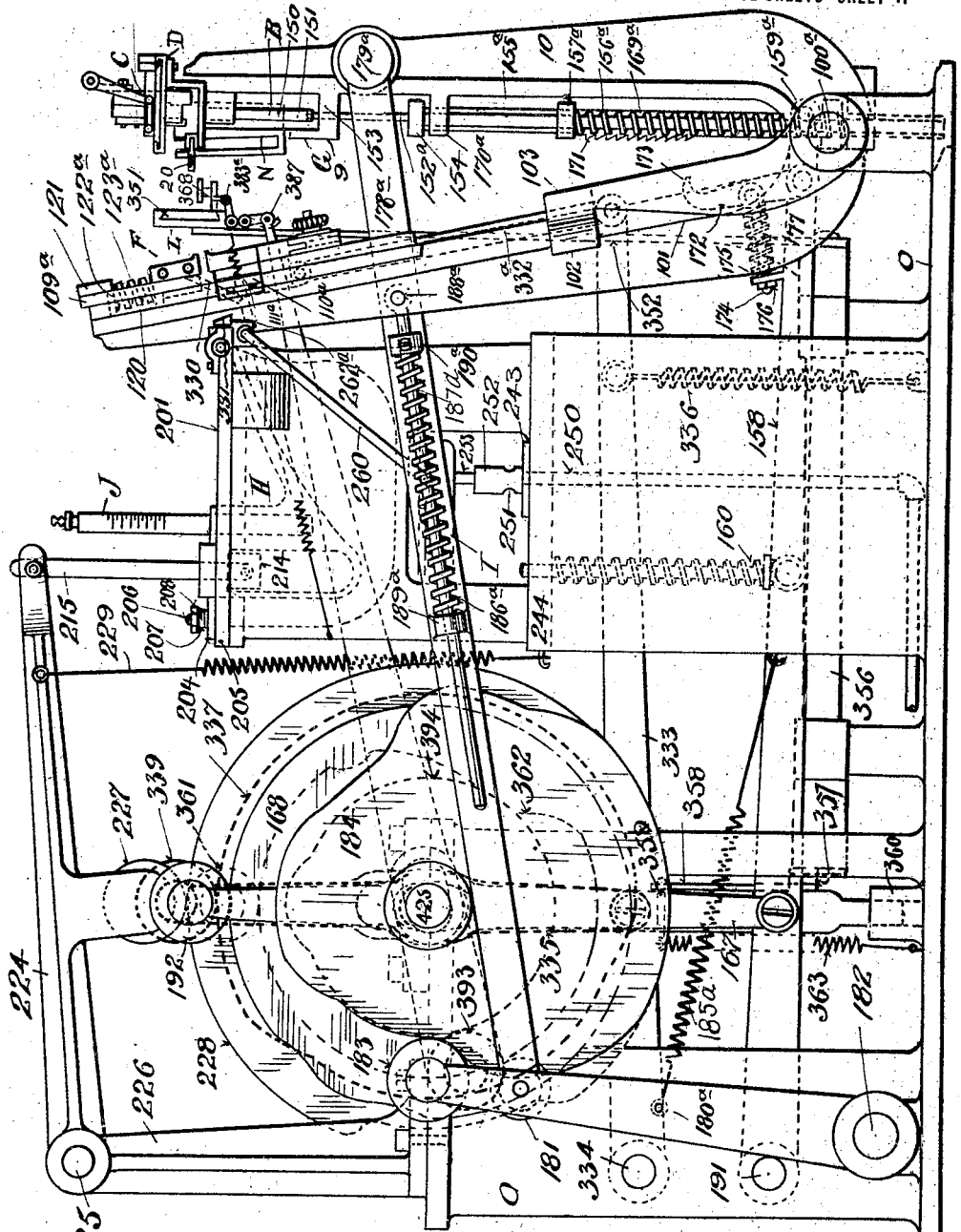
Fig. 4 is an elevation of Fig. 1.
Figure 5:
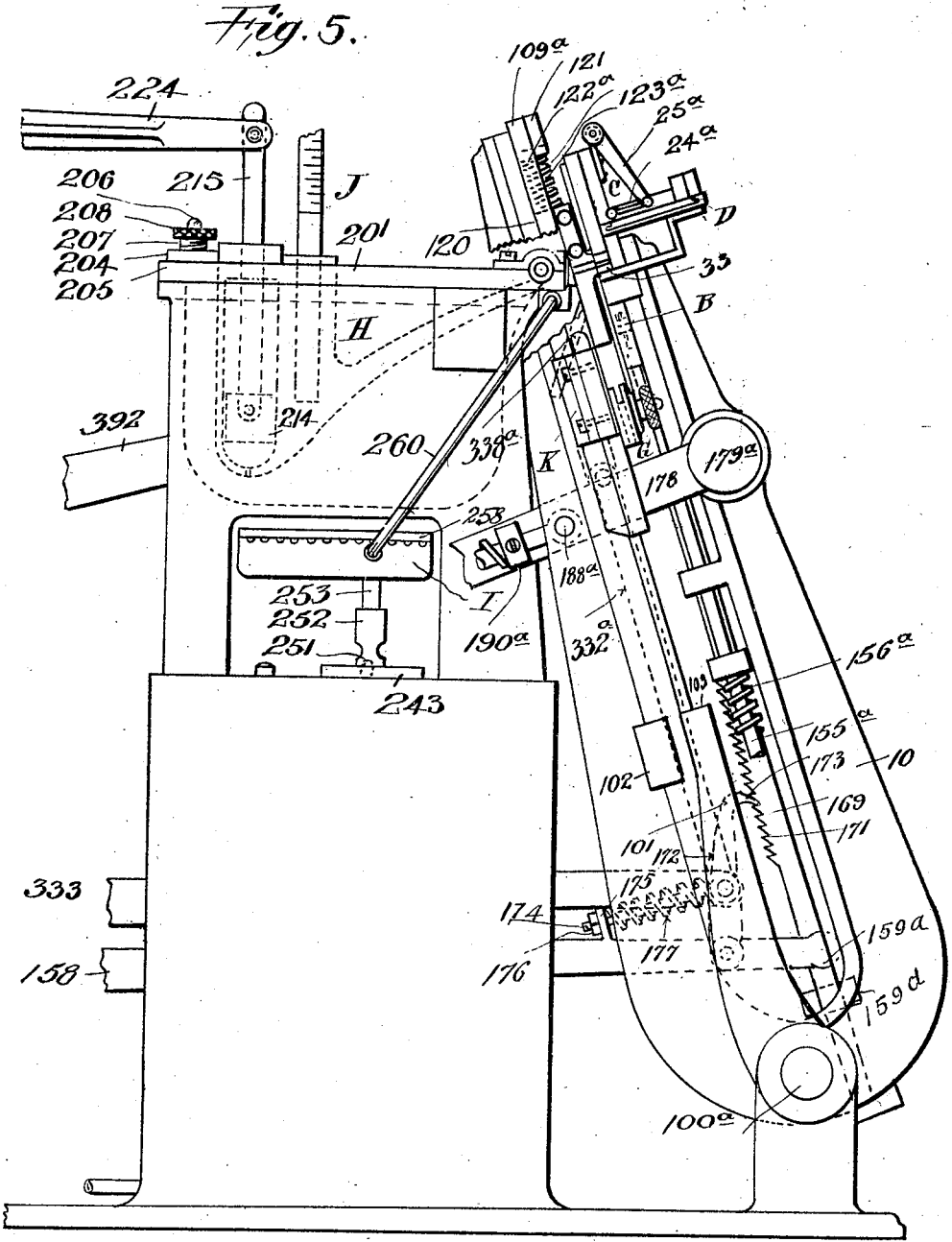
Fig. 5 is an elevation in the casting position.
Figure 6:
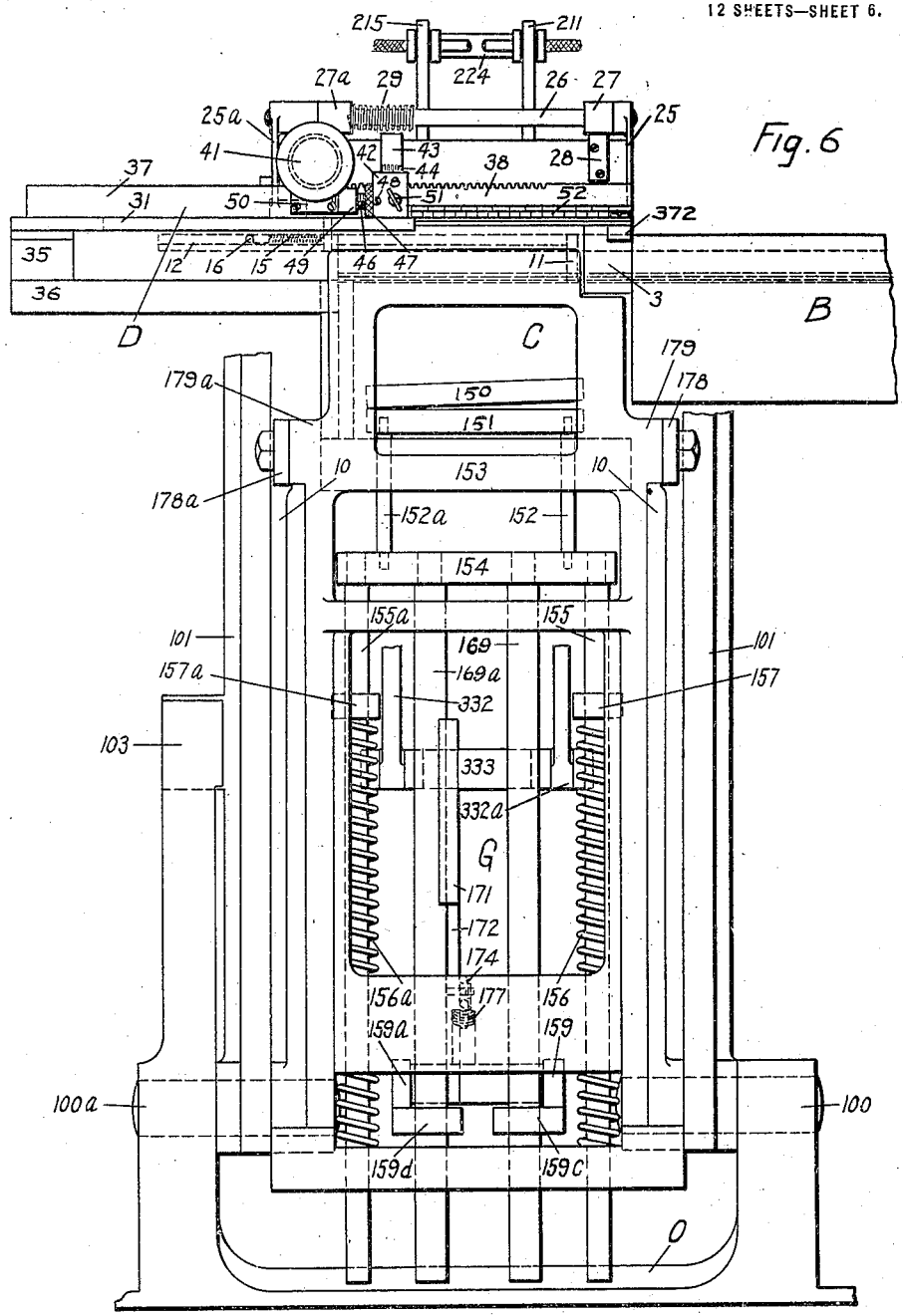
Fig. 6 is a front elevation in the initial position.

A, is the assembled line of matrices and spacers.

B, is the line delivery channel.

C, is the vise.

D, is the liner carrier.

E, is the slug.

F, is the mold.

G, is the spacing mechanism.

H, is the metal pot.

I, is the gas burner.

J, is the thermostat.

K, is the sprue trimmer and mold opening device.

L, is the slug carrier.

M, is the slug trimmer.

N, is the matrix delivery channel.

O, is the main frame.

P, is the driving mechanism.

The construction and operation of my improved typographic composing machine is as follows:—

A series of matrices 1, bearing the characters necessary to produce the desired printing surface on a slug of the requisite length and having spacers, 2, for spacing the matrices are assembled in the usual manner by devices, well known in the art which form no part of my present invention, forming the line A.

The matrices 1, have their thickness reduced at $1^e$, $1^f$, and $1^g$, for the purpose of obtaining a contact between the matrices at the casting point $1^k$, as it often occurs that the matrices are more or less curved and by reducing the thickness, at three points, preferably on one side only and securing a contact at three points only, instead of along the entire length of the matrix, a much better contact is obtained at the casting point $1^k$. In practice about three one-thousandths of an inch is sufficient to overcome the curvature and obtain a good contact. Matrices have heretofore been stamped with its identifying character on the edge opposite to the intaglio in which the cast is made. Some of the matrices are very thin and when stamped on the edge with the necessarily small identifying character as in the case of an accent it is difficult to distinguish the tilde, macron, breve and circumflex, these characters being set as pi much time is consumed in finding the right character, which difficulty I obviate by stamping the identifying character of large size, on the side of the matrix, as shown at $1^b$, in addition to the usual stamping on the edge.

The spacers 2, may be of the same general form as ones now in use, but I have designed to use a spacer having the notch $2^b$, in the wedge $2^a$, in connection with the spacing mechanism to be hereinafter described. The line A, may be transferred from the assembling mechanism to the vise C, which forms a part of my invention, by any of the usual and well known means common to machines of this class, through the channel B, through the channel 39, in the vise jaw 3 and into the vise C.

As is usual in machines of this class the casting mechanism is set in motion by the action of the line A, being transferred from the assembling mechanism to the casting mechanism and when the casting mechanism has completed one cycle its movement ceases at its initial position and remains at rest until again set in motion as before described.

The channel $3^g$, of the vise jaw 3, has the grooves $3^a$, and $3^b$, for the lugs $2^d$ and $2^e$, of spacer 2 and the grooves $3^c$, $3^d$, $3^e$ and $3^f$, for the lugs $1^a$, $1^b$, $1^c$ and $1^d$ of the matrix 1.

The vise C, has the front plate 4, having the inclined groove $4^a$, for the lug $2^d$, of the spacer 2, and the grooves $4^b$, $4^c$ and $4^d$ for the lugs $1^a$, and $1^c$, of the matrix 1.

The vise C has the back plate 5, having the inclined grooves $5^a$, and $5^b$, for the lug $2^e$, of the spacer 2, and the groove $5^c$, for the lug $1^b$, of the matrix 1.

The groove $4^a$, in the front plate 4, and the grooves $5^a$, and $5^b$, in the back plate 5, in which the lugs of the spacers move and are retained, are inclined so that the spacers occupy different relative positions to the horizontal plane of the line A; the object of this is to prevent the adhesion of the molten metal to the slide $2^c$, of the spacer, as any individual spacer will occupy a different position in the line A, each time it is used, and it will therefore present a different part of its slide $2^c$, to the molten metal; the height of the slide $2^c$, being determined by its longitudinal position in the inclined groove.

The back plate 5, is adapted to occupy either of two positions, for which reason it has two grooves for the lugs of the spacers; the lower position is used when using two letter matrices in the lower position or when using two letter matrices in lower and upper positions to produce mixed faces of roman and italics or roman and black face and also when using one-letter matrices of ordinary sized faces.

The plate 5, is used in the upper position when using two letter matrices in the upper position exclusively or when using one letter matrices stamped to be used in the upper position only, as is the case with matrices for producing large faces.

The change of position of plate 5, is effected by changing the screws which secure it to the posts 7, and $7^a$; and when it is desired to raise the plate 5, the screws are changed from 53, to 54; 55, to 56; $53^a$, to $54^a$; $55^a$, to $56^a$.

The inclined grooves $4^a$, $5^a$, and $5^b$, in the vise C, for the lugs $2^d$, and $2^e$, of the spacers 2, facilitate the spacing of the line A. The pressure on the spacers from the driver 150, is upward and as the movement of the matrices and spacers that form the line A, is toward the higher end of the incline this allows the spacers to move with less resistance.

The lug $1^d$, of the matrix 1, is held in and alined by the grooves $6^a$, and $6^b$, in the lower back plate 6, of the vise C, the groove $6^a$, holding the lug $1^d$, when the matrix is in the upper position and the groove $6^b$, holding the lug $1^d$, when the matrix is in the lower position; the matrices of the line A, are alined by their lugs in the grooves of the vise C, and not by raising the matrices against a ledge of the mold as is common in machines of this class.

The back plate 5, of the vise C, is secured to the posts 7, and $7^a$, which are secured to the plate 4, and the lower back plate 6, is secured to the posts 8, and $8^a$, which are secured to the plate 4, the plate 4, being secured to the vise frame 10; and the plate 5, is supported and strengthened by the plate 9, which is secured to the vise frame 10.

The line holder 95, forms the limits of the line A, when spaced out by the spacers 2, and is that part of the vise C, in which the line A, is held during the operation of casting the slug; the line holder 95, is formed by the front plate 4, the back plate 5, the lower back plate 6, the right hand vise jaw 3, and the left hand vise jaw 11, and serves the purpose of holding and alining the matrices 1, and holding the spacers 2, during the successive operations to be hereinafter described.

The liner carrier D, supports and moves the liners 19, and 20, which form the end walls of the mold F. The left hand liner 20, is adjustable to suit the length of the slug E, to be cast from the line A, and the right hand liner 19, is stationary in its relation to the length of the slug E.

The liners 19, and 20, when used for slugs of large size body are designed to have the channel 83, in the right hand liner and the channel 84, in the left hand liner in which the channel bar 85, is seated. The channel bar is secured to the right hand liner by the screw 86, but is free to allow the movement of the left hand liner when it is to be adjusted to cast slugs of different lengths.

The channel bar bridges the space between the liners 19, and 20, and lies along the casting face of the upper mold section 104, and serves to reduce the size of the mold slot 108, and thereby reduce the amount of metal required to produce a slug. The slug E, when cast has the channel 80, on one side and extending the length of the slug, of a size in cross section equal to the cross section of the channel bar. The object is to use less metal and facilitate the cooling of the slugs. The ribs 81, and 82, on the slug are of such width that quads may be locked against them which cannot be done with the recessed slugs now in use.

In the usual form of recessed slugs the recesses are at right angles to the face of the slug, and formed between ribs which are cast in slots in the mold. This form of slug is objectionable as there is no support on the lower edge, between the ribs, and it is necessary to insert a heavy lead to permit of locking type against such a slug.

Two forms of the liners 19, and 20, are to be used in which the liner is in a different relative position with reference to its shank 87, and consequently in a different relative position with reference to its socket in which it is held.

The form shown at 19 and 20 is to be used with matrices of usual form in which the alinement is at the top of the character. Where slugs are ordinarily cast from the ordinary matrices the alinement must necessarily be at the top in present machines in which the lower part of the mold is stationary and permits of no adjustment and the top of the mold only being movable to accommodate lines of different thicknesses for slugs of different sized bodies.

The other form 92, is for matrices having a bottom alinement in which the upper part of the mold remains at a constant point during the casting operation regardless of the size of body being cast and the lower part of the mold is adjusted to suit the size of the slug.

In matrices designed to have a bottom alinement the type cast therefrom will all aline on the bottom of the characters by which for example, 6, 8, and 10 point may be made to aline on the same slug. Liners of either form may or may not be designed to use the channel bar 85, according to the body size of the slug to be produced.

It has been the prevailing practice in the use of what are known commercially as slug casting machines, to change the liners in the mold whenever it seemed necessary to change the length or body size of the slug to be cast. This change involves the removal of the liners from the mold and the substituting of others whenever the length or body size of the slug is to be changed.

My improved device enables a change to be made in the length of the slug without any change of liners one of the liners being adapted to a longitudinal movement to adjust the length of mold slot to any desired length of slug. In order to change the body size of the slug it is necessary to remove the liners and replace them with others.

The liners are retained in place by the stationary locking studs 90, and 90$^a$, and the locking pins 91, and 91$^a$, which are removed and replaced in changing from one set of liners to another.

I have designed to use the device shown in Fig. 33, for the purpose of casting, simultaneously, a series of short slugs of the same or different length, which slugs may or may not have printing characters thereon. The matrices 1, and spacers 2, are the same as those used in regular composed lines as described in connection with the line A; the divisions between the several matrices or assembled matrix lines being occupied by the separating block 93, which has the same general outline as the regular matrix 1, and differs from a quad matrix in having the projecting blade 94, which corresponds in length and thickness with the width and thickness of the liners that are being used; the blade 94, is secured to the block 93, by the screw 96, and the dovetail 97, and may be removed to facilitate the assembling of the matrix line, the blades being attached to the separating blocks after the assembled matrix line has been transferred into the line holder 95.

The blade 94, enters the mold slot in the same manner as the liners and forms the several end walls in the same manner as the liners form the end walls of the mold slot in the regular process of casting a single slug. In the use of this device the line is assembled manually, the spacer or spacers being inserted preferably near the left hand end of the line, the assembled line being spaced and cast and the slugs removed in the same manner or a similar manner as described for a single slug.

This device is to be used for recasting or repeating the casting operation from the same assembled line, in which case the pusher 369, which is used for the purpose of transferring the line A, to the channel B, may be removed.

It is obvious that ordinary movable type may be cast in the same manner described for casting short slugs.

The liner carrier D, has the plate 21, which is supported by the guides 22, and 22ª, on the ways 23, and 23ª, and has a movement on the said ways for the purpose of moving the liners 19, and 20, out of the vise C, to allow the entrance of the line A: the links 24, and 24ª, form connections from the guides 22, and 22ª, on the plate 21, to the arms 25, and 25ª, which are secured to the shaft 26, in bearings 27, and 27ª, in the brackets 28, and 28ª, attached to the plate 4; on the shaft 26, is the torsion spring 29, which acts to turn the shaft 26, and through the arms 25, and 25ª, and the links 24, and 24ª, to actuate the liner carrier D, in its movement out of the vise C.

The plate 21, which forms a part of the liner carrier, has the ways 30, and 30ª, on which the plate 31, has a movement at a right angle to the movement of the plate 21, for the adjustment of the liner 20, to determine the length of the slug to be cast; the plate 31, has the arm 35, which carries the liner socket 33, in which the liner 20, is removably secured by the pins 91, and 91ª, passing through the socket 33, and the shank 87, of the liner 20; the arm 35, is supported by the bracket 36, which is attached to the post 8ª.

The plate 31, has attached thereto the bar 37, and the plate 21, has attached thereto the rack 38; attached to the bar 37, is a bearing block 40, supporting the pinion 39, in mesh with the rack 38, which pinion is rotated by the hand wheel 41.

The block 42, is formed to straddle the bar 37, and the rack 38, and has a connection with the rack 38, through the pin 43, which is semicircular at one end, and has the teeth 44, cut thereon which engage with the ratchet shaped teeth 45, cut on the rack 38; its connection to the bar 37, is through the screw 46, having the milled head 47; the screw 46, is connected to the block 42, by the screw 48, which fits in a slot in the screw 46, to allow its rotation, the screw 46, works in a nut 49, which is a part of the block 50, which is attached to the bar 37; by rotating the screw 46, the position of the block 42, is adjusted in its relation to the bar 37, and is held in position by the screw 51.

The block 42, and with it the bar 37, the plate 31, the arm 35, the liner socket 33, and the liner 20, may be moved by the hand wheel 41, to the position indicated on the scale 52, to correspond with the length of the slug to be cast, and these parts are locked in the desired position by the teeth 44, of the pin 43, which engage the teeth 45, of the rack 38.

The line A, as it is transferred from the assembling mechanism into the line holder 95, in the vise C, in the usual and well known manner, encounters the left hand vise jaw 11, on the slide 12, and the line A, moves the vise jaw 11, from its position in the channel 3ᵍ, in the right hand vise jaw 3, just inside of the channel B, to a position in the vise C, determined by the length of the line A.

The vise jaw 11, acts as a support for the left hand end of the line A, and prevents the end matrices from being displaced from their vertical position, which is a well known source of trouble in machines of this class.

The slide 12, moves in ways 13, formed in the bracket 14, which is attached to the post 8ª, and at the time of the transfer of the line A, from the assembling mechanism into the vise C, the left hand vise jaw 11, which is attached to the slide 12, stands in its initial position in the channel 3ᵍ, in the right hand vise jaw 3, at clearance distance from the channel B, to which position it has been retracted from the full extent of its travel, by the spring 15, which was compressed by the pin 16, on the slide 12, impinging against the block 17, which action returned the left hand vise jaw 11, from its position in the channel B, to which it was moved in order to transfer the line A, into the channel B, to its initial position in the right hand vise jaw 3, in order to allow the movement of the vise C.

The left hand vise jaw is limited in its movement into the vise C, by the banking pin 18, attached to the slide 12, which impinges against the plate 31, which plate determines by its position, the length of slug to be cast, the vise jaw 11, on the slide 12, forms the limit on the left hand end of the length to which the line A, may be spaced by the spacers 2, the line A, in the vise C, will move the vise jaw 11, to the left to an extent due to the length of the line A, before being spaced by the spacers 2, the spacers 2, spreading the line and moving the vise jaw 11, against the end of the liner socket 33, and the banking pin 18, against the end of the plate 31.

The right hand vise jaw is attached to the plate 21, of the liner carrier D, and has the channel 3ᵍ, and the liner socket 32, and liner 19, which are fulcrumed on the plate 3.

The vise jaw 3, is in such position that the channel 3ᵍ, is in line with the channel in the vise C, when the line A, is to be received from the channel B, and when the line A, is locked against the mold F, the vise jaw 3, has moved to such a position by the action of the liner carrier D, that the channel 3ᵍ, is out of line with the channel in the vise C, and the vise jaw 3, has passed over and closed the channel in the vise C, the vise jaw 3, forming the limit on the right hand end, to which the line A, may be spaced out.

The line A, in the vise C, previous to being spaced by the spacers 2, is moved to the mold F; the liner carrier D, which supports and actuates the vise jaw 3, the liner sockets 32, and 33, and the liners 19, and 20, move with the vise C, until the liners 19, and 20, enter the mold and the liner sockets 32, and 33, impinge against the mold. The vise C moves farther however and causes the torsion spring 29 to be further compressed, the liner sockets 32, and 33, assuming a position in line with the line A, in the vise as the line A, is brought into contact with the mold; the vise C, is actuated through its frame 10, which is supported on the shafts 100, and 100ª, which shafts also support the mold frame 101, and are journaled in the main frame O; when the vise C, stands in its initial position where it receives the line A, through the channel B, the mold F, stands in its initial or extreme forward position in which it is retained by the buffer 102, on the frame 101, impinging on the arm 103, which is a part of the main frame O.

The vise C, and its frame 10, through which it is actuated, receives its motion through the connection 178, connected to the frame 10, at 179, and to the cam lever 180, at 181, the cam lever 180, fulcrumed at 182, having the cam roll 183, and receives its motion from the cam 184, and springs 185, and 185ª.

The mold F, and its frame 101, in its movement from the initial position to the casting position is actuated by the impinging of the vise C, against the mold.

The mold F, and its frame 101, in moving from the casting position to the initial position receives its motion through the springs 186, and 186ª, on the rods 187, and 187ª, connected to the mold frame 101, at 188, and 188ª, the projecting lugs on the connection 178, through which the vise C, is actuated and through which lugs the rods 187, and 187ª, pass by their action on the springs 186, and 186ª, cause the mold F, and its frame 101, to move forward to the limit of its movement with the vise C, the further motion of the vise C causing an additional compression of the springs 186, and 186ª.

As the vise C, moves the mold F, to the casting position the tension on the springs 186, and 186ª, is gradually reduced, so that when the mold has reached the casting position, the tension is nearly eliminated on the springs and also the pressure between the vise C, and the mold F; after the spacing of the line A, is accomplished the vise C, locks the line A, against the mold by direct pressure through the cam 184.

The mold F, has the sections 104, and 105, which form the upper and lower sides of the mold slot 108, in which the slug is cast; the section 104, having the projecting face 106, and the section 105, having the projecting face 107, against which the line A, is locked during the casting operation; the liners 19, and 20, forming the ends of the mold slot, the liner 20 being capable of adjustment to form the length of slug required.

The mold section 105, is stationary on the posts 109, and 109ª, except for the purpose of adjustment to secure proper alinement of the characters on the line A, with reference to the body of the slug whereon the characters are to be cast.

The mold section 105, is connected to the posts 109, and 109ª, by means of the blocks 110, and 110ª, and the gibs 111, and 111ª, and its adjustment is effected by means of a supporting bar 112, having at its ends the inclined and downwardly projecting tongues 113, and 113ª, the tongue 113, having a rack 116, cut thereon. The bar 112, has at one end, the inclined bearing on the block 114, and at the other end the inclined bearing on the block 114ª.

The block 114 is secured to the post 109, and the block 114ª, is secured to the post 109ª; the endwise movement of the bar 112, raises or lowers the mold section 105.

This movement of the bar 112, is effected by the pinion 115, in mesh with the rack 116, on the bar 112; the pinion 115, is turned by the knob 117, the amount of movement being determined by the disk 118, having the graduations 119.

The mold section 104, is supported by and is movable on the posts 109, and 109ª, which are secured to the mold frame 101, and moves in ways formed by the mold section 104, and the plate 120, the ends of the said plate forming the bearings and guides on the posts 109, and 109ª; the posts 109, and 109ª, are connected at their upper ends by the tie bar 121, which has the lugs 122, and 122ª, which form the bearing for the upper ends of the springs 123, and 123ª, which springs rest at their lower ends on the plate 120, and serve to close the mold section 104, on the liners 19, and 20, at the time of the casting operation.

The mold section 104, has the tube 124, leading to the passage 125, for the admission of water to the mold section 104, for the purpose of cooling the mold and the slug cast therein; the water passes through the duct 125, and out of the tube 126; the tube 124, has a connection for a flexible tube for the water supply and the tube 126, has a connection for a similar tube leading to the waste pipe.

When the vise C, and the mold F, stand in their initial positions, the mold section 104, is raised above the mold section 105, an amount sufficient for the liners 19, and 20, to enter between the mold sections.

When the line A, is in place in the vise C, the vise C, carried by the frame 10, moves toward the mold F, the liners 19, and 20, enter the mold slot 108, between the mold sections 104, and 105, and the liner sockets 32, and 33, rest against the faces 106, and 107, of the mold sections; and the mold section 104, now moves toward the mold section 105, until it rests on the liners 19, and 20, under the pressure of the springs 123, and 123$^a$; during the further movement of the vise C, toward the mold F, the liners 19, and 20, in the mold and the liner carrier D, remain stationary and the liner socket 33, is caused to enter the vise C, in which position the liner socket 33, is in line with the line A, the end 34 of the liner socket 33, being separated from the line A, by the left hand vise jaw 11, on the slide 12, the end 34, of the liner socket 33, forming the abutment against which the vise jaw 11, on the slide 12, is forced by the spacing of the line A, by mechanism to be hereinafter described.

The liner socket 32, which is fulcrumed on the plate 21, of the liner carrier D, by the movement of the vise C, above described, is caused to occupy a position at the right hand end of the line A, and opposite to the liner socket 33; this movement closes the channel 3$^s$, in the vise jaw 3, through which the line A, had passed to the vise C, and the line A, is in the position in the vise C, in which it is to be spaced out to the distance between the vise jaw 11, and the vise jaw 3; the line A, and the liner sockets 32, and 33, rest against the mold, the line A, closing the front of the mold slot 108, in the mold.

The continued movement of the vise C, moves the mold F, to the casting mechanism for the operation of casting the slug.

The spacing out of the line A, is effected by the spacing mechanism G; the spacing of the line A, begins as soon as the line is in contact with the mold, and is completed immediately before the mold F, has received the full pressure of the springs 186, and 186$^a$. When the locking of the vise C is completed the vise is pressed against the mold and the mold against the metal pot H.

The action of the spacers 2, in the line A, is through the driver 150, attached to the bar 151, and receives its movement through the bar 151, the rods 152, and 152$^a$, the bar 154, and the rods 155, and 155$^a$, which are actuated by the springs 156, and 156$^a$, the lower ends of which rest on the frame 10, and the upper ends of which act against the collars 157, and 157$^a$, the cam action serving only to raise the lever 158, to allow the springs to act; the reverse movement is accomplished by the lever 158, and the spring 160, which must be strong enough to overcome the tension of the springs 156, and 156$^a$. Attached to the bar 151, at 166, and 166$^a$, is a plate 161, having the hook 162, adapted to engage the notch 2$^b$, in the spacer 2. The hook 162, is held in engagement with the notch 2$^b$, of the spacer 2, by the spring 163, attached to the plate 161, at one end and to the hook 164, at the other end; the stud 165, limits the movement of the plate 161, to allow a proper engagement of the hook 162, with the notch 2$^b$, of the spacer 2.

When the line A, is in the vise C, the lug 2$^d$, is in the groove 4$^a$, of the plate 4, and the lug 2$^e$, of the spacer is in the groove 5$^a$, or the groove 5$^b$, of the plate 5, according to the position of the said plate.

The line A, is spaced out by the driving of the wedge 2$^a$, on the slide 2$^c$, by the action of the driver 150, actuated by the springs 156, and 156$^a$.

The spacer driver 150, is yieldingly held at one end to the bar 151, it being held to the bar by the studs 195, and 195$^a$, adapted to allow one end of the driver 150, to move toward and away from the bar 151.

This movement allows the driver 150, to assume an inclined position with reference to the bar 151, it being held in this inclined position by the spring 194, and is prevented from moving beyond a predetermined limit by the pins 196, and 196$^a$, the studs 195, and 195$^a$, being cut away on one side to allow this movement and the portion of the studs not cut away acting as a stop to limit this movement.

The object of the inclination of the driver 150, is to facilitate the movement of the spacers 2, as any movement of the matrices 1, and spacers 2, in spacing out the line A, will be in the direction of the lower end of the driver 150 and this inclination will allow the lower end of the spacers to slide on the driver and thereby maintain a vertical position thus avoiding any tendency to break the spacer; as the pressure on the spacers from the bar 151, increases after the matrices and spacers have moved to the limit of the line holder 95, the spring 194, will be compressed and the driver 150, will assume a horizontal position allowing the spacers to receive the full force of the driver 150, and allow all the spacers to be driven to practically the same height thus securing uniform spacing.

The driver 150, rises to the limit of the drive on the spacers, driving them the distance necessary to space out the line A.

The cam 168, now allows the lever 158, to descend under the action of the spring 160, which is of sufficient tension to overcome the tension of the springs 156, and 156$^a$.

The descent of the lever 158, compresses the springs 156, and 156$^a$, and withdraws the driver 150, from contact with the spacers 2, through the action of the pawl 172, the hook 173, engaging the rack 171, on the rod 169ª.

The hook 173, of the pawl 172, engages the rack 171, at a point corresponding to the height to which the rod 169ª, has been driven up by the spring 156ª.

The hook 162, on the plate 161, is in engagement with the notch 2ᵇ, of the spacer 2; the descent of the lever 158, acting through the pawl 172, actuated by the said lever, withdraws the driver 150, from contact with the spacers and through the action of the hook 162, on the plate 161, withdraws the spacers to such an extent as to leave the matrices 1, and the spacers 2, which compose the line A, free from pressure to allow the units which compose the line A, to readjust themselves and assume a normal position.

The lever 158, is again raised by the cam 168, to allow the driver 150, under the action of the springs 156, and 156ª, to drive the spacers 2, for the final spacing.

The first action of the driver 150, is for the purpose of spreading the line A, to the limit of the jaws of the vise C, the spacers are then withdrawn for the purpose of loosening the units of the line A, so that they may assume a normal position and thereby obtain a tighter wedging when driven the second time, than could be obtained if the second driving was performed upon the spacers when already partially tightened.

The pawl 172, is fulcrumed on the lever 158, and has a rod 174, one end of which is loosely held in the pawl 172, its other end passing through an eyebolt 175.

The rod 174, is threaded and has the adjusting nut 176; a spring 177 is interposed between the pawl 172, and the eyebolt 175, by which means the hook 173, of the pawl 172, is in position to engage the rack 171, only when the vise frame 10, and mold frame 101, are in such positions that the line A, is in contact with the mold F, and when the line A, in the vise C, is out of contact with the mold F, the pawl 172, does not engage the rack 171.

The vise frame 10, carrying the vise C, and the spacing mechanism G, and the mold frame 101, carrying the mold F, and the sprue trimmer and mold opening device K, are moved from the forward position of the mold frame 101, to the casting position where the mold F, impinges against the metal pot H; the spacing of the line A, takes place during this movement of the vise C, and the mold F, from the initial position of the mold F, to the casting position; the second or final drive of the spacers 2, taking place after the mold F, is in contact with the metal pot H, but before the full pressure of the springs 186, and 186ª, is applied.

The pump plunger is raised by the action of the cam 228, and at the same time the vise C, and the mold F, are in a position in which the buffer 102, of the mold arm 101, is in contact with the stop 103, with the line A, in the vise C, still in contact with the mold F.

The slug in the mold is now trimmed by the sprue trimmer K, to remove the sprues and shave it to type size by the knife 330, which is attached to the slides 331, moving in ways formed by the mold section 105, and the gibs 127, and 127ª, attached to posts 109, and 109ª.

The slide 331, is operated through the connections 332, and 332ª, the lever 333, fulcrumed at 334, the link 335, the spring 336, and the cam 337.

When the edge of the knife has passed the slug and it has been trimmed, the lever 158, which operates the spacing mechanism descends by the action of the spring 160, at the time of the descent of the lever 158, the pawl 172, is out of contact with the rack 171, by reason of the forward movement of the vise frame 10, which carries the spacing mechanism and the descent of the lever 158, causes it at its bifurcated end 159, and 159ª, to contact with the collars 159ᶜ, and 159ᵈ, forcing the rods 169, and 169ª, downward, retracting the spacing mechanism against the pressure of the springs 156, and 156ª, on the rods 155, and 155ª.

The action relieves the pressure on the line A, through the action of the hook 162, engaging the spacer in the notch 2ᵇ, and loosening the spacers 2, and at the same time the line A, in the vise C, is moved out of contact with the mold F, the mold remaining stationary, this position of the mold F, being the limit of the forward movement.

As soon as the line A, in the vise C, recedes from the mold F, the lever 333, which operates the trimming knives, continues its upward movement by which the buffers 338, and 338ª, impinge against the ends 129, and 129ª, of the arch 120, causing the mold section 104, to which the arch is attached to rise, releasing the slug in the mold F, from the pressure of the springs 123, and 123ª.

In the interval of time between the trimming of the back of the slug and the opening of the mold F, the vise C, has continued to move toward the position in which the line A, in the vise C, is in alinement with the channel N; and when the vise C, has moved a distance equal to the travel of the liner carrier D, the liner sockets 32, and 33, are withdrawn from the vise C, leaving the channel in the vise C, clear for the transfer of the line A, as soon as the vise C, reaches a position in which it is in alinement with the channel N.

The amount of travel of the vise C, before the mold F, is fully opened is equal to the amount of travel of the liner carrier D, and the liner socket 32, and 33, and the liners 19, and 20, begin to leave the mold as soon as the travel of the vise C, exceeds the movement of the liner carrier D.

As soon as the mold F, is opened it allows the further movement of the vise C, which withdraws the liners 19, and 20, from the mold F, and with the liners, the slug which is held between the ends of the liners.

The slide 350, in ways 351, is now moved into a position between the mold F, and the vise C, through the action of the lever 352, attached to the links 353, and 354, the link 353, being attached to the slide 350, at 355.

The lever 352, is on the shaft 356, and is operated by the lever 357, attached to the link 358, which is attached to the cam roll link 359, having a bearing at 360, and operated by the cam roll 361, and the cam 362, and the spring 363.

The slide 350, has the arms 364, and 364$^a$, which support the plate 365, which has the nuts 366, and 366$^a$, which operate the studs 367, and 367$^a$, projecting through the plate 365, and having secured to their upper ends the slug carrying plate 368, the slug carrying plate 368, is adjustable as to height, by means of the studs 367, and 367$^a$, and the nuts 366, and 366$^a$, for the purpose of adjusting it for varying thicknesses of slugs when using matrices having a bottom alinement as has been hereinbefore described in connection with the liners and mold.

When the slide 350, moves in a position between the mold F, and the vise C, the slug carrying plate 368, is below and about one half inch back of the slug, which is held between the ends of the liner 19, and the liner 20.

As the slide 350, approaches the limit of its travel the vise C, which has moved about one half inch beyond the channel N, into which the line A, is to be transferred now moves back, bringing the vise C, in line with the channel N, and the slug directly over the slug carrying plate 368, and also causes the pusher 369, attached to the slide 350, to project into the vise C, back of the vise jaw slide 12, in a position to operate the vise jaw slide 12, and thereby transfer the line A, from the vise C, into the channel N, on the reverse movement of the slide 350.

As the slide 350, approaches the limit of its travel the arm 370, attached to the slide 350, impinges at its end 371, against the liner carrier plate 21, and moves in a recess in the vise jaw 3, and a recess in the liner socket 32.

The liner socket 32, is fulcrumed on the liner carrier by the stud 373, and a stud 374, in the lever 372, connects with and imparts motion to the liner socket 32, on the stud 373.

The movement of the liner socket 32, imparts a slight movement to the liner 19, releasing the slug which is held between the liner 20, and the liner 19.

When the slug is directly over the slug carrying plate 368, and the slug is released from pressure by the movement of the liner 19, the grippers 375, and 375$^a$, descend on the slug forcing it onto the slug carrying plate 368.

The grippers of which two are shown and which I may use one or several according to the length of the slug are attached by the screws 376, and 376$^a$, to the gripper bar 377, and may be removed or turned out of position when not in use.

The gripper bar 377, has attached thereto the slides 378, and 378$^a$, which move in ways 379, and 379$^a$, in the brackets 380, and 380$^a$, and are operated through the links 381, and 381$^a$, attached to the gripper bar at 382, and 382$^a$, and the cranks 383, and 383$^a$, on the shaft 384, working in bearings in the brackets 380, and 380$^a$.

On the shaft 384, is the crank 386, having the crescent shaped contact which is acted on by the stud 390, in the crank 387, which is attached to the shaft 388, in the bearing 389.

The crank 386, operates the gripper bar 377, and forces the grippers 375, and 375$^a$, on the slug and the slug on to the slug carrying plate, the crank 386, operating the grippers in their downward movement and the springs 391, and 391$^a$, releasing the grippers from their contact with the slug on the reverse movement of the crank 386.

The crank 387, is operated through the cam yoke 392, the roller 393, cam 394, and spring 395.

The brackets 380, and 380$^a$, are attached to the slide 350, and the shaft 384, cranks 383, 383$^a$, and 386, reciprocate with the slide 350.

The bracket 389, is attached to the stationary ways 351, and the crank 387, has no reciprocating motion, consequently the stud 390, is in position to act on the crank 386, only when the slide 350, is in the position to receive the slug, when the action of the cam 394, actuates the cranks 387, 386, 383, and 383$^a$, thereby actuating the gripper bar 377, and the grippers 375, and 375$^a$, forcing the slugs onto the slug carrying plate 386.

The grippers 375, and 375$^a$, are now moved, by the action of the cam 394, the spring 395, on the cam yoke 392, and the springs 391, and 391$^a$, so that they are out of contact with the slug, leaving it on the slug carrying plate 368, where it is retained by the raised edges 396, and 397.

The slide 350, is now moved out of its position between the mold F, and the vise C, and the slug is moved to and under the trimming knife 400, for the purpose of removing the fins and projecting edges.

The knife 400, is secured to a sliding block 402, by the screw 403, the block 402, being movable in the bracket 401, by the action of the screw 405, having the shoulder 406, and the retaining plate 407.

The screw 405, is operated by the milled head 408, and secured to the screw 405, is a plate 409, having the graduation 410, registering with an index mark 411, by which the knife 400, is adjusted to trim slugs of different number of points in thickness.

When the slide 350, has moved far enough to be out of the path of the vise C, the slug has passed through the knife 400, and is in a position to be removed from the slug carrier to a galley which may be done by any of the suitable and well known devices pertaining to and used in the art.

The same movement of the slide 350, which trims the slug also removes the line A, from the vise C, into the channel N, by the action of the pusher 369, on the slide 350.

Attached to the slide 350, is a wiper 412, of felt or other suitable material which by the movement of the slide 350, is caused to move in wiping contact with the casting surfaces of the mold F, thereby removing any metal which may adhere thereto.

The wipers 413, and 414, attached to the slide 350, are for the purpose of wiping the liners 19, and 20, and are constructed and operated in a similar manner to the mold wiper 412, above described.

As soon as the line A, is removed from the vise C, to the channel N by the action of the pusher 369, engaging the slide 12, the slide 350, moves back far enough to allow the slide 12, to be withdrawn from the channel N, into the vise jaw 3, by the action of the spring 15, allowing the vise C, to continue its movement to its initial position in line with the channel B, where it is in position to receive another assembled line having completed the movement due to one cycle; during this movement of vise C, the slug carrier L, returns to its initial position.

Rotary motion is given to the cams which operate and control the herebefore described mechanism by the shaft 425, which has secured thereto the gear 426, which is in mesh with the pinion 427, on the driving shaft 428, in bearings 429, and 430, being held in position by the collars 431, and 432.

The clutch rod is operated by the spring 439, to throw the clutch into contact with the pulley and by link 440 acting on the collar 437, to throw the clutch out of contact with the pulley.

The driving shaft 428, has a clutch pulley 433, and a clutch 434, which is operated by the clutch rod 435, connected to the clutch 434, at 436.

The clutch rod 435, passes through a bore in the driving shaft 428, and is connected to a collar 437, on the outside of the shaft 428, by a screw 438, which passes through a slot in the shaft 428.

On the shaft 428, is a collar 441, in which the shaft turns freely, having a wedge shaped side bearing surface 442, and the square 443.

The link 440, has the wedge shaped bearing surface 444, which acts on the wedge shaped bearing surface of the collar 441.

The link 444, engages the square 443, on the collar 441, and prevents it from turning on the shaft 428.

The link 440, has a reciprocating motion on the square 443, and being held from lateral movement by the collar 464, which is fast on the shaft 428, imparts by its reciprocating motion a movement to the collar 441, in the direction of the length of the shaft and the collar being connected to the clutch rod 435, imparts a longitudinal movement to the said clutch rod; the driving shaft clutch pulley, clutch rod spring, collar and lever being of a construction well known in the art.

The rotation of the shaft 428, through the engagement of the clutch 434, which is fast on said shaft, with the clutch pulley 433, to which motive power is applied by a belt imparts rotary motion to the shaft 425, through the pinion 427, and the gear 426.

Reciprocating motion is imparted to the link 440, by the lever 445, fulcrumed at 446, to the base 447, on the side of the main frame of the machine, the lever 445, being connected to the link 440, at 465, and having the spring 448, which retains it, and the coacting part in operative position when not acted on by disengaging mechanism to be hereafter described.

When the shaft 425, is at rest, the link 440, being raised against the tension of the spring 448, the clutch rod 435, is holding the clutch 434, out of engagement with the clutch pulley 433.

When motion is to be imparted to the shaft 425, the lever 449, on the shaft 450, is actuated by the transfer of the line A, from the assembling mechanism to the vise C, in the usual and well known manner, the link 451, forms a connection from the lever 449, at 452, to the lever 453, at 454.

The lever 453, fulcrumed at 455, and having the roller 456, impinges against the detent 457, carried by the cam 458, releasing the detent 457, which is fulcrumed on the cam 458, at 461; the detent 457, is released against the tension of the spring 460, throwing the hook 459, on the detent 457, out of contact with the buffer 462, on the lever 445, releasing the lever 445, and under the action of the spring 448, the link releases the collar 441, from contact with the collar 437, allowing the clutch rod 435, under the action of the spring 439, to act against the collar 466, on the clutch rod 435, forcing the clutch into contact with the clutch pulley 433; thereby rotating the shaft 425, and cam 458.

The rotation of the cam 458, retracts the roller 456, from contact with the detent 457, allowing the hook 459, to assume its initial position, under the action of the spring 460, so that when the cam 458, has nearly completed a revolution the hook 459, will impinge on the buffer 462, forcing the buffer and with it, its end of the lever 445, downward and raise the link 440, thereby throwing the clutch 434, out of contact with the clutch pulley 433.

As the clutch releases the clutch pulley the downward movement of the buffer and its end of the lever 445, forces the friction 463, on the end of the lever 445, against the rim 467, of the cam 458, causing the cam 458, and shaft 425, to stop without shock or over-motion.

The lever 445, being fulcrumed at 446, which is not concentric with the shaft 425, provides a gripping action to the friction 463, which is effective and also easily released.

Having thus described my invention, what I claim and desire to secure by Letters Patent is:—

1. In a machine of the class described, a stationary metal pot, a movable mold, moving to and away from the metal pot in a circular path at right angles to the face of the metal pot throat, a vise movable in a circular path at right angles to the face of the mold and adapted to carry a matrix to and away from the said mold and to move said mold against the metal pot, means for casting a slug in the said mold and means for removing the slug in the said circular path.

2. In a machine of the class described, a stationary metal pot, a movable mold having the mold section 104, and the mold section 105, moving to and away from the said metal pot, a movable vise adapted to carry a matrix to and away from the said mold, the said vise having the liner 19, and the liner 20, carried thereby, the said liners being adapted to be moved into and out of operative relations with the said mold sections 104, and 105, by the movement of the said vise, as it moves to and away from the said mold.

3. In a machine of the class described, a stationary metal pot, a mold moving to and away from the said metal pot, a vise adapted to carry a matrix to and away from the said mold; means for supplying molten metal to the said mold to form a slug and means carried by the said vise to remove the said slug from the said mold.

4. In a machine of the class described, means for confining the line of matrices within certain predetermined limits and including side plates having longitudinal grooves to receive the lugs of the matrices in said line, one of said plates being adjustable whereby it may be arranged in different horizontal planes to support the upper, rear lugs of the matrices in said line when the latter are used in different horizontal planes.

5. In a machine of the class described the combination of a mold and means for presenting a line of matrices to the mold, comprising members between which the matrices are received, and having means thereon for engaging the upper, rear lugs of the matrices to support the matrices before and during their presentation to the mold said supporting means being adjustable in position to hold the matrices in an upper or lower position, and means for operating said line holding means to present said line of matrices to the mold while held by said supporting means.

6. In a machine of the class described, the combination of a mold and means for presenting a line of matrices in the upper position to the mold, comprising members between which the line of matrices is received, and having means independent of the mold for engaging the upper and lower lugs of the matrices to support the matrices before and during their presentation to the mold and means for operating said line holding means to present said line of matrices to the mold while held by said supporting means.

7. In a machine of the class described, the combination of a mold and a matrix holder adapted to hold a composed line of matrices having upper and lower front lugs and upper and lower rear lugs, the said matrix holder having a front plate with grooves for the upper and lower front lugs of the matrices and an upper rear plate with a groove for holding the upper rear lugs of the matrices and a lower rear plate with a groove for holding the lower rear lugs of the matrices, the said upper and lower rear plates admitting a casting contact of the matrices with the mold between the said plates.

8. In a machine of the class described the combination of a mold, means for supporting a line of matrices during presentation to the mold and for presenting the line to said mold, said supporting means having inclined supporting grooves, for the purpose of supporting space bands in said line.

9. In a machine of the class described the combination of a mold, means for confining a line of matrices within predetermined limits during their presentation to said mold, said means including front and rear plates adapted to receive the matrices between them when said line is advanced in the direction of its length, said confining means including the vise jaw 11 and the vise jaw 3.

10. In a machine of the class described the combination of a mold, means for confining a line of matrices within certain predetermined limits, including front and back plates, a vise jaw 11 and a vise jaw 3, the latter moving toward and from the mold and having the channel 3ᵍ, said latter vise jaw being adapted to be moved to cause the channel 3ᵍ, to aline with said confining means or be moved out of alinement therewith.

11. In a machine of the class described, means for confining a line of matrices within certain predetermined limits, a mold having the upper section 104, and the lower section 105, forming the upper and lower walls of the mold slot 108, the liner 19, and the liner 20, adapted to form the end walls of the said mold slot and means for moving the said liners into and out of operative relation with the mold section 104, and the mold section 105, said liners being adapted to withdraw the slug from said mold as they retract from the mold.

12. In a machine of the class described the combination with a mold, of means for presenting a line of matrices to said mold for casting a slug, and liners movable into and out of said mold and adapted when moved out of said mold to eject the slug therefrom.

13. In a machine of the class described, the vise C, the mold F, having the mold slot 108, and the liner carrier D, the liner 19, and the liner 20, carried by the liner carrier D, the vise C, and the liner carrier D, being adapted to move into juxtaposition with the mold F, thereby moving the said liners into a position in the mold F, to form the end walls of the said mold slot, said liners being adapted to eject the slug from said mold.

14. In a machine of the class described, the vise C, having a line holder 95, the liner carrier D, and the vise jaw 3, having the channel 3ᵍ, normally in line with the said line holder 95, and means for moving the said vise jaw, from its normal position to a position in which the said vise jaw forms an abutting end wall of the line holder 95.

15. In a machine of the class described, the line holder 95, having the plate 4, and the plate 5, for confining the line of matrices within certain predetermined limits, said plates having grooves for the lugs of the said matrices, the plate 5, being adapted to be adjusted on said line holder to receive the lugs of the matrices of the line of the matrices, when used in different horizontal planes.

16. In a machine of the class described, a mold, a line holder for holding a line of matrices and for presenting them to said mold, said line holder comprising coöperating plates adapted to receive the matrices between them, and having grooves to receive the lugs of the matrices and grooves to receive the lugs of the spacers, said grooves for the spacers being inclined in relation to the grooves for the matrices.

17. In a machine of the class described the combination of a mold, means movable laterally toward and from the mold and adapted to hold a line composed partly of matrices, said means having a groove 6ᵃ adapted to receive the lower alining rear lugs of the matrices whereby said lugs are supported by the line holder during the casting operation.

18. In a machine of the class described the combination of a mold, means for presenting a line of matrices to and withdrawing them from said mold and adapted to be moved laterally of said mold in said operations, said line holding means having the grooves 6ᵃ and 6ᵇ to receive the lower alining lugs of the matrices in either of two positions.

19. In a machine of the class described, the vise C, having the line holder 95, the liner carrier D, having the plate 21, supported by and having a movement on guides attached to the said vise; the plate 21 having attached thereto and moving with it, the vise jaw 3, which carries the liner socket 32, and the liner 19.

20. In a machine of the class described, the vise C, having the line holder 95, the liner carrier D, having the plate 21, which carries the vise jaw 3, the liner socket 32, and the liner 19, the upper mold section 104, and the lower mold section 105, forming the upper and lower walls of the mold slot 108, and means for moving the liner 19, between the upper and lower mold sections to form one end wall of the mold slot 108.

21. In a machine of the class described, the vise C, having the plate 21, and the plate 31, carrying the liner 20, the upper mold section 104, and the lower mold section 105, forming the upper and lower wall of the mold slot 108, and means for moving the liner 20, between the upper and lower mold section to form one end of the said mold slot.

22. In a machine of the class described, the vise C, the liner carrier D, having the plate 21, and the plate 31, carrying the liner 20, the mold sections 104, and 105, forming the upper and lower walls of the mold slot 108, means for moving the liner 20, between the said mold sections to form one end wall of the said mold slot and means for moving the plate 31, to adjust the liner 20, longitudinally to form an end wall to the mold at any predetermined point in the length of said mold sections.

23. In a machine of the class described, the vise C, and the liner carrier D, having the plate 21, and the plate 31, and the liner 20, the bar 37, attached to the plate 31, the rack 38, attached to the plate 21, a hand wheel shaft and pinion supported by the bar 37, the pinion 39, meshing with the rack 38, whereby movement is imparted to the plate 31, and the liner 20.

24. In a machine of the class described, the vise C, and the liner carrier D, having the plate 21, and the plate 31, and the arm 35; the liner socket 33, and the liner 20, and means for adjusting the plate 31, in relation to the plate 21.

25. In a machine of the class described, the vise C, having the line holder 95, and adapted to hold a line of matrices, the slide 12, and the vise jaw 11, and means for moving said vise jaw in the said line holder to remove the said line from the said line holder.

26. In a machine of the class described, the vise C, having the line holder 95, adapted to hold the line A, the slide 12, and the vise jaw 11, the said vise jaw being adapted to lie in the path of the line A, and be moved by the line A, to the limit of the travel of the said line.

27. In a machine of the class described, the vise C, having the line holder 95, adapted to hold the line A, the slide 12, having the vise jaw 11, the liner carrier D, and the liner socket 33, means for adjusting the said liner socket to such a position relative to the length of the line holder 95, that the said liner socket will act as an abutment for the vise jaw 11, and limit the travel of the said vise jaw in the said line holder to correspond to the predetermined length of the line A.

28. In a machine of the class described, the vise C, having the line holder 95, adapted to hold the line A, the slide 12, having the vise jaw 11, the said vise jaw standing in the path of the line A, when the said line enters the line holder 95, and moving with and in advance of the said line acts as a support to the leading matrix in the said line to prevent its displacement.

29. In a machine of the class described, the liner carrier D, having the plate 21, and the plate 31, moving in ways thereon and carrying the liner socket and liner, the bar 37, attached to the plate 31, and the rack 38, attached to the plate 21, a pinion rotatably connected to said bar and meshing with the said rack to impart longitudinal motion to the said bar and the plate 31; the block 42, adjustably mounted on the said bar and engaging the said rack by means of the pin 43, engaging teeth on the said rack.

30. In a machine of the class described, the vise C, having the line holder 95, adapted to receive and retain the line A, the liner carrier D, the mold F, having the mold section 104, and the mold section 105, forming the upper and the lower walls of the mold slot 108, and liners 19, and 20, and means for causing the vise C, to approach the mold F, causing the liners 19, and 20, to assume a position between upper and lower mold sections to form the end walls of the mold slot 108.

31. In a machine of the class described, the vise C, having the liner carrier D, the said liner carrier having the liner sockets 32, and 33, and the liners 19, and 20; the mold F, having the mold sections 104, and 105, to form the upper and lower walls of the mold slot 108, means for imparting motion to the vise C, causing the liner sockets 32, and 33, to impinge against the mold sections 104, and 105, and the liners 19, and 20, to enter between the mold sections 104, and 105, to form the end walls of the mold slot 108.

32. In a machine of the class described, the vise C, the liner carrier D, the liners 19, and 20, the mold sections 104, and 105, to form side walls of the mold slot 108, means for causing the vise C, to approach the said mold sections and means to cause the said liners to enter between the said mold sections to form the end walls of the said mold slot, and means to cause the mold section 104, to be depressed on the said liners and the said liners to be depressed on to the mold section 105.

33. In a machine of the class described, the mold sections 104, and 105, the liners 19, and 20, means for raising the mold section 104, to allow the said liners to be inserted between the said mold sections, means for inserting the said liners between the said mold sections and means for depressing the mold section 104, onto the said liners and depressing the said liners onto the mold section 105, to form the mold slot 108.

34. In a machine of the class described, the mold section 104, and the mold section 105, the liner 19, and the liner 20, forming the mold slot 108, the bar 112, the block 114, the block 114ª, and means for moving the said bar in the direction of its length to adjust the height of the mold section 105.

35. In a machine of the class described the combination of a metal pot, a mold having an upper section and a lower section, liners at each end thereof, separating said sections, the said liners forming the end walls of the mold slot and movable into and out of the mold and a bar contiguous to one of said mold sections and movable into and out of the mold with said liners and adapted to form a slug having a channel arranged lengthwise of the slug and of a thickness which is less than the slug whereby the slug will have top and bottom flanges.

36. A mold having a mold slot 108, formed by an upper section and a lower section, separated by a liner at each end of the said mold slot, said liners being movable into and out of the mold, a channel bar embedded in the liners and movable therewith into and out of the mold, one of the said liners being adapted to be adjusted to vary the length of the said mold slot, means for injecting molten metal into the said mold slot; said channel bar being adapted to form a slug having a channel extending lengthwise thereof throughout its length and two longitudinal ribs on the edge of the slug.

37. A mold having the mold slot 108, and the section 104, and the section 105, the liner 19, and the liner 20, the said liners forming the end walls of the said mold slot, means substantially as described for casting a slug in the said mold slot and means for removing said liners, said liners being adapted when removed to simultaneously eject the slug from the mold.

38. A metal pot adapted to contain molten metal, a mold having the mold slot 108, impinging against the said metal pot; the vise C, having the line holder 95, adapted to hold the line of matrices, impinging against the said mold by the movement of the vise C; means for casting a slug in the said mold slot; means for retracting the vise C, and the line of matrices from contact with the said mold liners for said mold and means for removing the said liners from the mold said liners being adapted to eject the slug from the said mold simultaneously with the retraction of the vise C.

39. A mold having the section 104, and the section 105, forming the longitudinal walls of the mold slot 108, the liner 19, and the liner 20, forming the end walls of the said mold slot, means substantially as described to inject molten metal into the said mold slot to form a slug; and means for removing the said liners from the said mold, said liners being adapted to eject the slug from said mold simultaneously with their removal from the mold.

40. A mold having the section 104, and the section 105, the liner 19, and the liner 20, forming the end walls of the mold slot 108, means substantially as described for casting a slug in the said mold slot, means substantially as described for opening the said mold; the liner carrier D, and means for actuating the said liner carrier to withdraw the said liners, said liners being adapted to eject the slug from the said mold.

41. A mold having the mold slot 108, and the section 104, and the section 105, the liner carrier D, and liners to form the end walls of the said mold slot, means for actuating the said liner carrier to insert the said liners between the said mold sections, means for clamping the said liners between the said mold sections, means for releasing the said liners, and means for actuating the said liner carrier to withdraw the said liners from their position between the said mold sections, said liners being adapted to eject the slug from the mold when they are withdrawn from the latter.

42. A mold having the section 104, and the section 105, the liner 19, and the liner 20, means for reciprocating the said liners into operative relation with the said mold sections, and out of operative relation with the said mold sections, said liners being adapted to eject the slug from the mold as they are retracted from the latter.

43. A mold having an upper section and a lower section and liners to form a mold slot adapted to have a slug cast therein, means substantially as described for casting a slug in the said mold slot; the slide 331, having the knife 330, for trimming the sprues from the slug, means for actuating the said slide and the said knife, means for continuing the movement of the said slide, and means including the said slide and coacting parts to open the said mold and means for removing the slug from the said mold.

44. A mold having a mold slot and means for injecting molten metal into the said mold slot to form a slug, movable liners for said mold adapted to eject the slug from the said mold slot, and means for moving the said mold through an arc of a circle from the position of casting the slug to the position of removing the slug from the said mold.

45. A mold having a mold slot, means for injecting molten metal into the said mold slot, means for moving the said mold through an arc of a circle from the position of casting the slug to the position of removing the slug from the said mold; and liners for said mold adapted to remove the said slug tangentially to the paths described by the said mold.

46. A mold having an upper section and a lower section, the liner 19, and the liner 20, the said mold sections and the said liners forming the mold slot 108, the liner carrier D, on which the said liners are mounted and means for actuating the said liner carrier for the purpose of moving the said liners into and out of the position in which they act in conjunction with the said mold sections to form the said mold slot.

47. An upper mold section and a lower mold section, a right hand liner, and a left hand liner, the said mold sections and the said liners forming the walls of the mold slot 108, means for injecting molten metal into the said mold slot to form a slug, and the liner carrier D, said liners being adapted to remove the slug out of the said mold slot.

48. An upper mold section and a lower mold section, a right hand liner and a left hand liner, the said mold sections and the said liners forming the walls of the mold slot 108, means for injecting a fluxive substance into the said mold slot to form a slug; the liner carrier D, said liners being adapted to remove the slug from the said mold slot, and the slug carrier L, adapted to receive the said slug from said liners.

49. In a machine of the class described the combination of a mold, liners for said mold, means for removing the liners from said mold and means for wiping said liners while removed from said mold.

50. An upper mold section and a lower mold section, the slide 50, means for actuating the said slide, and the wiper 442, adapted to wipe the inside walls of the said mold sections.

51. The liner carrier D, the liner 19, and the liner 20 mounted on and carried by the said liner carrier, the said liners being adapted to retain a slug between their ends, the slide 50, the slug carrier L, mounted on and carried by the slide 50, and adapted to receive a slug from the said liners, and means for releasing the slug from the said liners.

52. The vise C, liner carrier D, the liner 19, and the liner 20, the vise C, having the line holder 95, adapted to hold the line A, the channel N, the slide 12, the slide 350, to actuate the slide 12, for the purpose of removing the line A, from the line holder 95, to the channel N.

53. A machine of the class described including means for casting a slug, a vise for the matrices, a line holder for maintaining a line of matrices in the vise and along which the matrices are adapted to slide and a vise jaw engaged by the forward end of the line of matrices and adapted to be moved along by the latter as they advance in said line holder and to maintain the matrices upright while moving along the line holder and adapted to serve as a vise jaw for locking up the line of matrices during casting.

54. A machine of the class described including means for casting a slug, a vise for the matrices, a line holder for maintaining a line of matrices in the vise and along which the matrices are adapted to slide, a vise jaw engaged by the forward end of the line of matrices and adapted to be moved along thereby as the matrices advance in the line holder and adapted to maintain the matrices upright in the line holder and to lock them up during casting, and means for moving said vise jaw in a reverse direction to eject the matrices from the line holder.

55. In a machine of the class described, the combination of a mold, liners for said mold, means for removing the liners from said mold, and means for wiping the internal faces of said mold while the liners are removed therefrom.

In testimony whereof I hereby affix my signature this fourteenth day of December, 1915.

EVERETT M. LOW.

Witness:
FANNIE J. LOW.